United States Patent [19]

Mayhew

[11] Patent Number: 5,050,064

[45] Date of Patent: Sep. 17, 1991

[54] METHOD FOR CONTROLLING THE BLENDING OF SOLIDS WITH A COMPUTER

[75] Inventor: Robert L. Mayhew, Richmond, Va.

[73] Assignee: E. I. Du Pont de Nemours and Company, Wilmington, Del.

[21] Appl. No.: 446,772

[22] Filed: Dec. 6, 1989

[51] Int. Cl.[5] .............................................. G06F 15/46

[52] U.S. Cl. .................................... 364/172; 364/153; 364/502

[58] Field of Search ............... 364/172, 173, 500, 502, 364/509, 510, 152, 153, 156, 154; 422/62, 110; 137/3, 88; 428/221, 224, 284, 286, 327, 340, 365, 372, 361

[56] References Cited

U.S. PATENT DOCUMENTS

| | | | |
|---|---|---|---|
| 3,940,600 | 2/1976 | Alexander et al. ................. | 364/172 |
| 4,616,308 | 10/1986 | Morshedi et al. .............. | 364/172 X |
| 4,779,186 | 10/1988 | Handke et al. ...................... | 364/172 |
| 4,979,091 | 12/1990 | Albers ............................ | 364/172 X |

*Primary Examiner*—Joseph Ruggiero

[57] ABSTRACT

A method of controlling with a computer the blending of solids from a plurality of sources. The sources of solids, having at least one common physical property, are selected in succession pairwise to achieve a predetermined goal value of the common physical property for the solids blend.

3 Claims, 4 Drawing Sheets

METHOD FOR CONTROLLING THE BLENDING OF SOLIDS WITH A COMPUTER

1. Field of the Invention

This invention relates to a method of controlling with a computer the blending of solids from a plurality of sources. More particularly, solids are blended that have at least one common physical property to achieve a goal blend of the common physical property.

2. Background of the Invention

Solids blending is desirable in many manufacturing processes, especially those processes where the solids are the products of individual batch operation and, as a result, possess more or less varying properties. A typical example is the blending of polymer for the production of nonwoven sheets. Consecutive batches of polymer can vary in physical properties such as melt index and rheology number which, if not properly blended, result in decreased product uniformity.

In the past, multiple sources of polymer having varying physical properties were delivered to a blending vessel and then used directly to make nonwoven sheets. The polymer was delivered from each source in a fixed sequence and for fixed time periods. The blend formed in this way was comprised of layers in the blending vessel and stratified according to the physical properties of the polymer from each source used to make the blend. No other control means over the blending of physical properties was attempted.

It has now been discovered by the process of this invention, that solids with at least one common physical property can be blended with a computer to produce a goal value of the common physical property.

SUMMARY OF THE INVENTION

Figure 1:
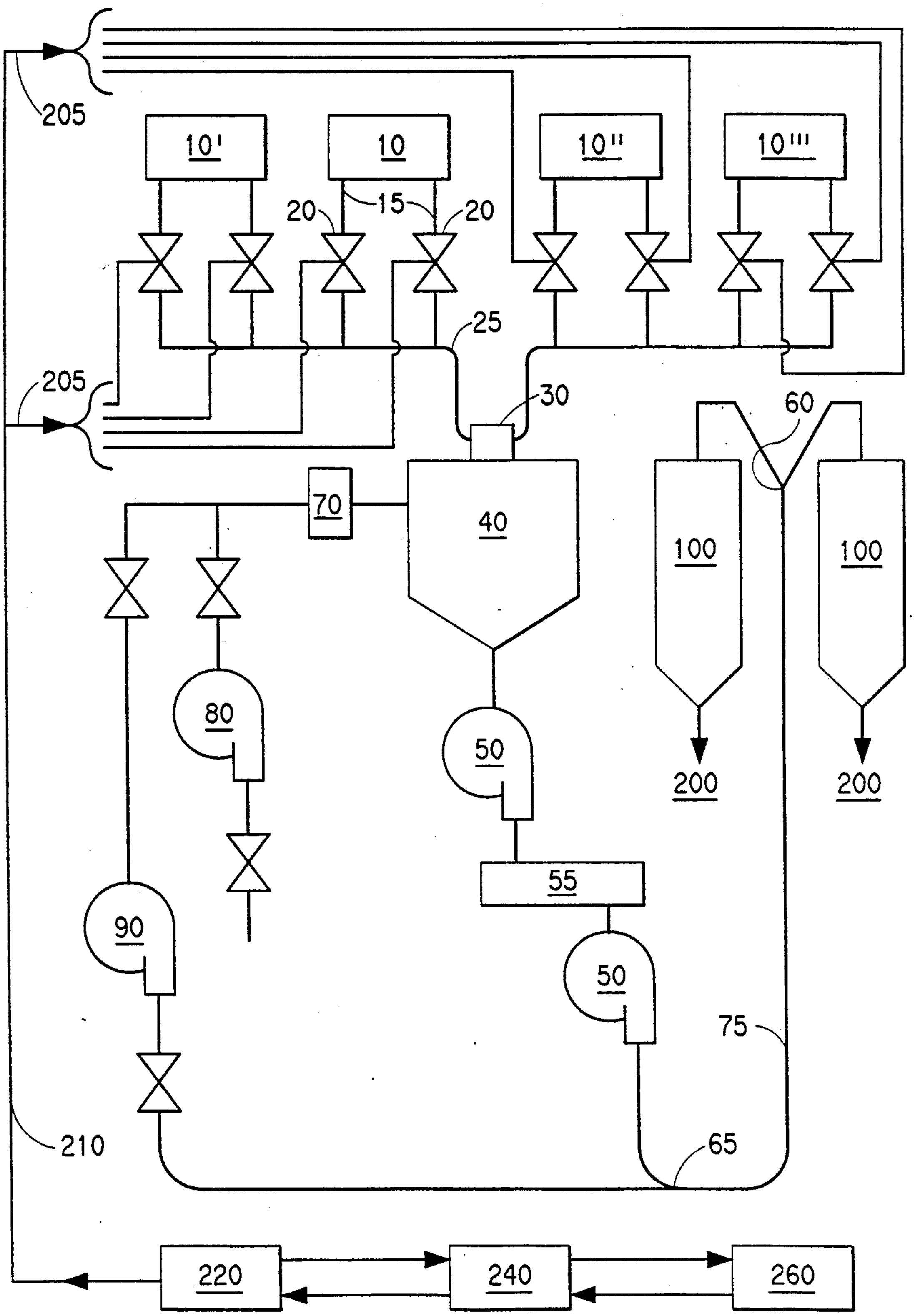
FIG. 1 shows schematically a polymer unloading and blending process.

Controlling blending of solids according to the process of this invention, requires that at least one pair of solid sources can deliver a solids blend achieving a predetermined goal value chosen for the process. This assumption includes the combination of a single unloading source "paired" with itself. In such a case, the actual value of the common physical property of the particular source equals the predetermined goal value. "Predetermined goal value" as used herein refers to the value of the common physical property desired.

The delivery rate of solids from any source to the blend is taken to be a constant. For this reason, time of delivery of solids is proportional to the amount of solids delivered by any source.

To control the blending of solids in accordance with the process of the invention, a computer is provided with a data base including at least;

(i) the predetermined goal value of the common physical property, (ii) a value of the common physical property for each of the sources, and (iii) a predetermined lower and upper time limit for withdrawing solids from the sources.

The value of the common physical property of each source greater than the predetermined goal value is assigned to a first data array in the computer. The value of the common physical property of each source less than the predetermined goal value is assigned to a second data array in the computer.

From the first data array a first source with the common physical property value closest to the predetermined goal value is selected. From the second data array a second source with the common physical property value closest to the predetermined goal value is selected.

The first and second sources selected as described above are paired and a time t(1) and a time t(2) is calculated for withdrawing solids from the paired sources according to the equations;

$$t(2) = (x + y)[P(g) - P(1)]/[P(2) - P(1)] \text{ and}$$
$$t(1) = (x + y) - t(2);$$

where:

P(g)=the predetermined goal value

P(1)=the value of the common physical property of a first source in the first data array P(2)=the value of the common physical property of a second source in the second data array t(1)=time for withdrawing solids from the source in the first data array, t(2)=time for withdrawing solids from the source in the second data array, It can be determined empirically, that times for drawing solids from a source for less than time x has the potential to starve the silos feeding the process. Conversely, times greater than time y minutes may not yield good blending in the silos. For these reasons, $$x \leqq t(1) \leqq y,$$
$$x \leqq t(2) \leqq y \text{ and}$$
$$t(1) + t(2) = (x + y),$$

where:

x=the lower time limit for withdrawing solids from the sources, y=the upper time limit for withdrawing solids from the sources, The calculated times t(1) and t(2) are stored in a buffer in the computer. A default value for t(1) and t(2) equal to (x+y)/2 is assigned for each solids source having a common physical property equal to P(g) and t(1) and t(2) are stored in the buffer.

The blending of solids is controlled by withdrawing solids from the sources for times t(1) and t(2) stored in the buffer.

Steps (d), (e), (f), (g), (h), (i) and (j) can be repetitively performed until at least one array is empty. When one array is empty, the predetermined goal value can be readjusted toward an average of the values of the common physical properties of the remaining sources and performing steps (a) to (j).

DETAILED DESCRIPTION OF THE PREFERRED EMBODIMENTS

The present invention is not limited for use in controlling the blending of solid polymers, but may also be advantageously used with other types of solids blending.

Referring now to FIG. 1, the embodiment chosen for purposes of illustration shows the essential elements of a polymer unloading and blending process. Typically, four sources 10 holding polymer are connected to the process through pairs of hoses 15. Valves 20 connect each hose to piping 25 which converge to a filter 30. The filter is connected to a separator 40 and bag filter, which is connected to a pair of rotary feeders 50, separated from each other by a shaker-sifter 55. Polymer flow into the separator 40 is maintained by vacuum produced by a blower 80 which is protected from polymer fines contamination by a filter 70 placed between the separator 40 and the blower 80. Transfer piping 75 is connected to the outlet of the second rotary feeder 50 at a point 65 where the polymer is entrained in a blast of air from the blower 90. Piping 75 conveys polymer and air to a diverter valve 60, which selectively feeds polymer to either of two identical polymer storage silos 100. Each silo 100 is connected to the process at point 200. Polymer delivery from the source 10 is controlled via timer and sequence programs in the supervisory computer 260 which communicates via distributed control system 240 to the programmable logic controller 220 which in turn opens and closes the valves 20 in response to signals transmitted from the programmable logic controller 220 through line 210 connected to the control lines 205 for each valve.

In operation, the preferred sequence of delivering polymer to the silos from each of the sources in FIG. 1 is determined by a program in the supervisory computer 260. This sequence is calculated from a predetermined goal value of a physical property, common to all solids to be blended, manually entered into the supervisory computer 260 along with the common physical property value of each polymer source on hand and the identification of the hoses 15 connected in pairs to the sources 10. The programmable logic controller (hereinafter PLC) 220 transmits signals which open selected pairs of hose valves, one at a time, for the period of time prescribed by the algorithm running in the supervisory computer (hereinafter SC) 260. When any valve 20 is opened, the vacuum created in the piping 25 by the action of the blower 80 causes polymer to be forced into a separator 40. Rotary feeders 50 further convey the polymer, from which polymer fines and dust have been removed, by the action of the separator 40 and the shaker-sifter 55 to point 65 where the air blasts from the blower 90 entrains the polymer in piping 75 to deliver polymer to either storage silo 100. The rate of delivery of polymer to the silos 100 is controlled by the combination of vacuum provided by blower 80, the rotary feeders 50 and entraining air flow from the blower 90. The constant delivery rate of this combination of devices blower 80, rotary feeders 50 and blower 90, ensures that any of the eight hose (hose 15 and valve 20) assemblies will convey a constant quantity of polymer in a uniform time interval. Thus, opening any valve 20 for a fixed period of time unloads a fixed and reproducible amount of polymer.

Typical components as described herein are:

| ELEMENT NUMBER | ELEMENT NAME | COMMERCIAL IDENTIFICATION |
|---|---|---|
| 220 | A-B PROGRAMMABLE LOGIC CONTROLLER | ALLEN BRADLEY PLC 2/30, ALLEN-BRADLEY CO., INC. MILWAUKEE, WISCONSIN |
| 240 | DISTRIBUTED CONTROL SYSTEM (DCS) | MODEL TDC-3000 DCS, HONEYWELL INC. MINNEAPOLIS, MINNESOTA |
| 260 | SUPERVISORY COMPUTER (SC) | DEC VAX SERIES COMPUTER DIGITAL EQUIPMENT CORP. MAYNARD, MASSACHUSETTS |
| 15 | HOSES TO RAIL CAR | FLEXICO PART NO. SF-400,5" DIA, 20' LG. |
| 20 | HOSE VALVES AND ACTUATOR | DEZURIK VALVE MODEL 9039302 |
| 30 | FINES SEPARATOR | YOUNG IND. BAG FILTER WITH TIMER NO. 1033 SHOP NO. 4192 |
| 40 | CYCLONE SEPARATOR | YOUNG INDUSTRIES PART NO. VC72-16-40 SHOP NO. 4192 |
| | VACUUM BREAKER | DEMCO VALVE PART NO. 19948-12902 |
| 50 | ROTARY FEEDER | YOUNG IND. SIZE NO. 14-S SHOP NO. 4192 |
| 55 | SHAKER SIFTER | GYRO TYPE, SPRT-WLD MODEL 73-2145 |
| 60 | DIVERTER VALVE | YOUNG INDUSTRIES PART NO. PN. 9210-7011-16 SHOP NO. 4192 |
| 70 | FILTER | YOUNG INDUSTRIES NO. IF-G8-2SN. IF-2291 SHOP NO. 4192 |
| 80, 90 | BLOWER, VACUUM, PRESSURE | GARDNER-DENVER MODEL 7CDL17H, 1960 CFM, 2140 RPM, 75-HP/100-HP |
| 100 | BLENDER SILOS (L-1,2) | R. D. COLE MFG. 8'-10" OD × 24'-6" LG. VERTICAL SILO-STORAGE |

Figure 2A:
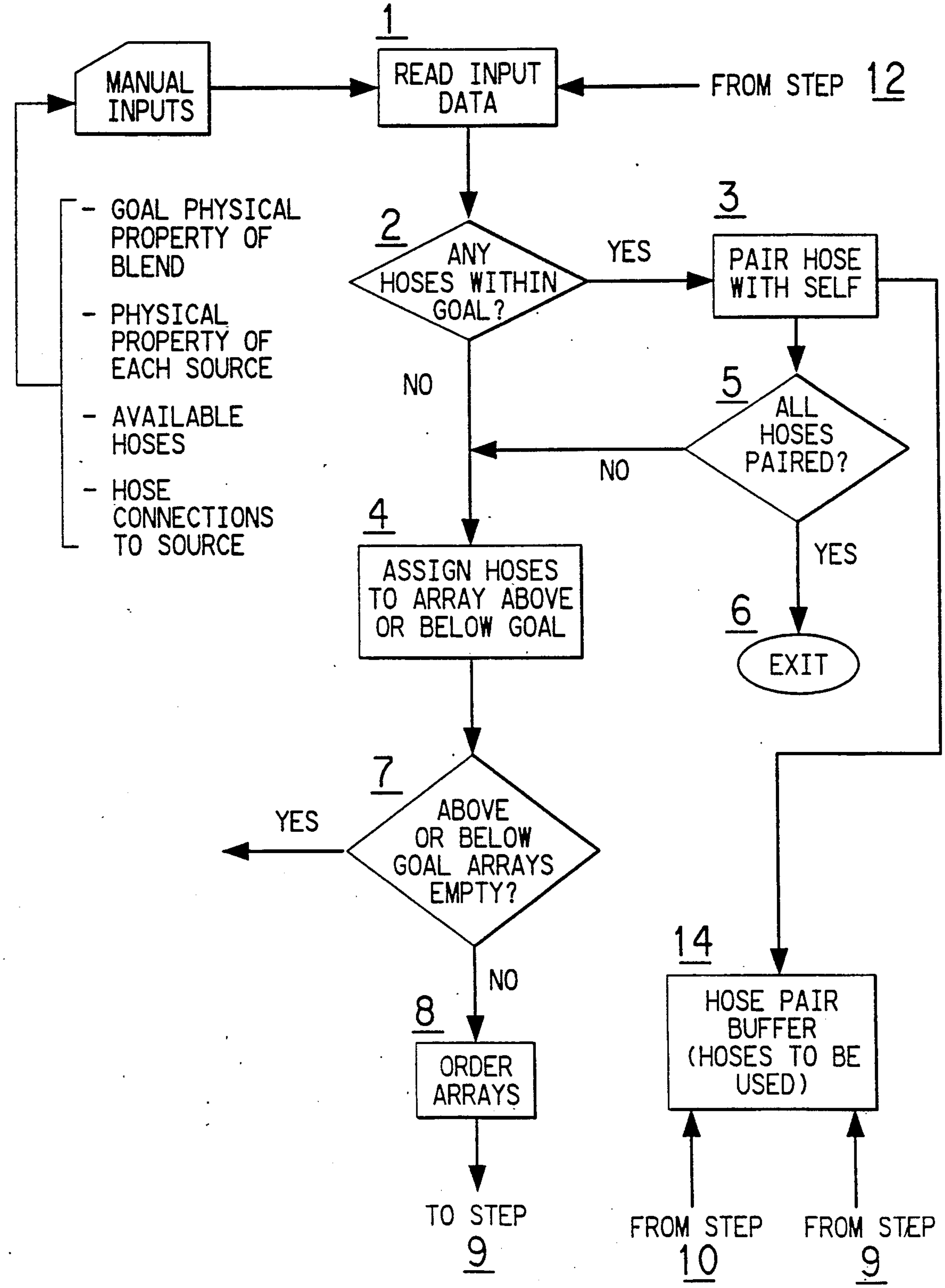
FIGS. 2*a* & 2*b* is a flow diagram for a computer.
Figure 2B:
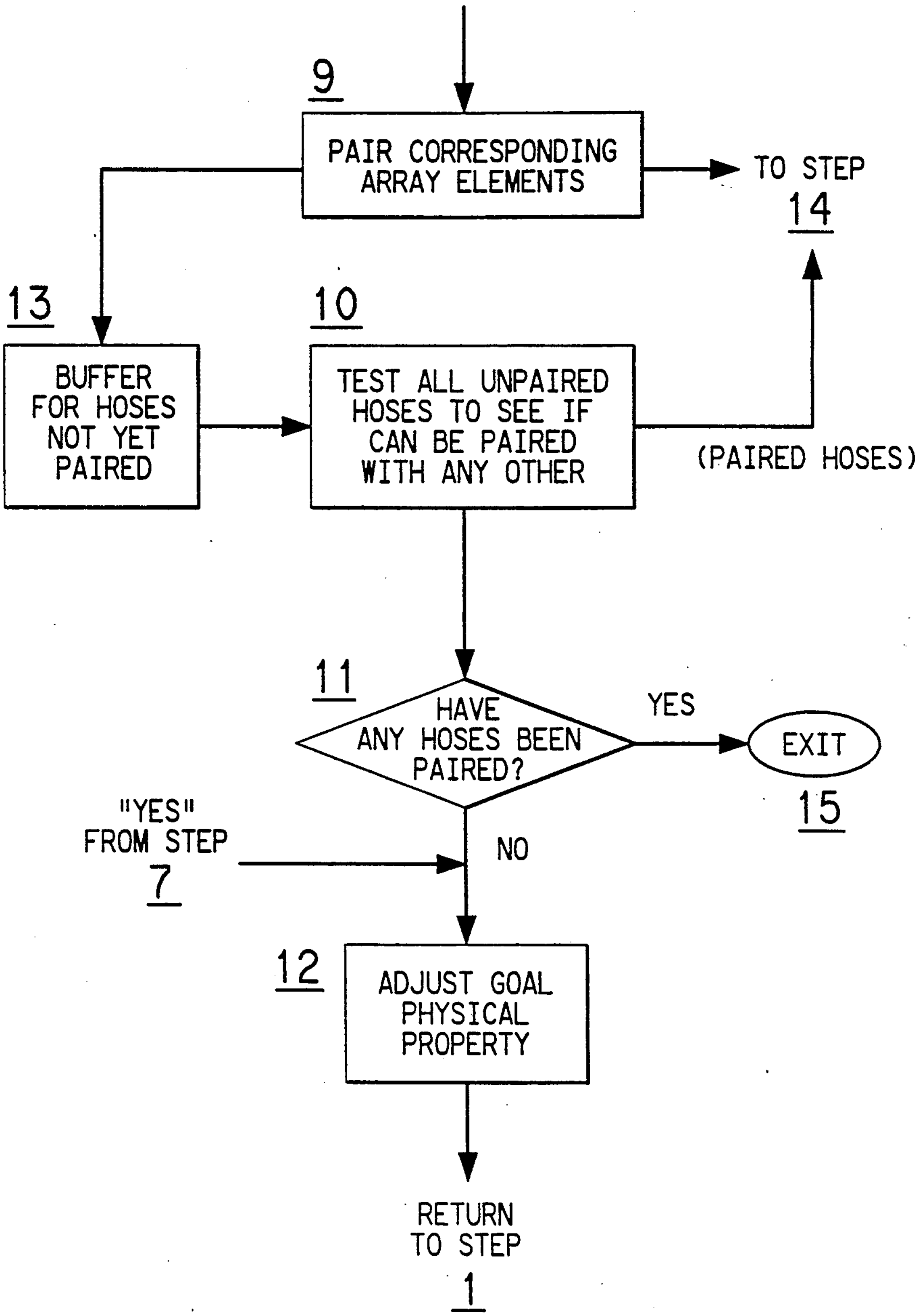

The foregoing steps are used as described in the following discussion and with reference to the attached flow and logic diagram (FIGS. 2*a* & 2*b*). To begin, an operator makes manual inputs to the supervisory computer 260. The manually input data defines at least the predetermined goal value of the common physical property and the values of the common physical properties in each source. The hose connections to each source can be entered as well. The supervisory computer then calculates a sequence of unloading and timer settings for sources which will meet the goal physical property for the process. The supervisory computer 260 communicates down to the programmable logic controller 220 through a distributed control system 240 the sequence generated and length of time each hose valve 20 is opened to deliver the right blend to the silos 100.

Referring now to FIGS. 2*a* and 2*b*, each source is examined and compared with the predetermined goal value in Block #2. Conveniently, hoses are referred to as the source to which they are connected. If a single source (or hose) meets the predetermined goal value within an arbitrary chosen range set for the process, it is paired with itself in Block #3 (a source paired with itself is assigned a timer value of $(x+y)/2$. Paired sources are placed in buffer Block #14 for downloading to the PLC 220.

Source pairing is examined in Block #5. When all are paired, the block is exited at Block #6. Remaining sources are examined and those sources not meeting the goal physical property fall through to Block #4.

In Block #4 there are two arrays. One array records sources with common physical property values above the predetermined goal value and another array records sources with common physical property values below the predetermined goal value. Block #7 tests the array contents for sources which either can deliver solid above or below the predetermined goal value. If one array is empty, then Block #12 is activated.

In Block #12, the predetermined goal value is readjusted towards an average of the values of the common physical properties of the remaining sources in the occupied array and the loop is re-established in Block #1. The premise behind this redefinition of goal physical property is that process continuity is more critical than controlling the blending of solids.

If there are sources in each array in Block #4, the Block #8 is active. The sources in the above predetermined goal value array are arranged in ascending order and sources in the below predetermined goal value array are arranged in descending order.

Next, Block #9 is activated and sources, nearest neighbors above and below the predetermined goal value, are paired. This pair is further tested to see what ratio of solid is needed to provide the goal physical property subject to the time constraints described herein. That is, no source should unload for a time less than x minutes or a time greater than y minutes. If calculation of unloading times yields times outside these constraints, the unloading times are defaulted to x and y minutes respectively. But, before these sources are paired they are further tested to determine if the pair can meet the predetermined goal value with times of x and y. If not, the source pair is set aside in Block #13.

The process of pairing the nearest neighbors in succession above and below the goal physical property is continued in Block #9. The result is a nested set of source pairs symmetrically disposed about the predetermined goal value.

Block #10 is activated after all pairings are tested. Those sources that were not paired and temporarily buffered in Block #13, are checked against all other sources to see if they may be paired to deliver the goal physical property with time constraints established herein. If so, then they are loaded into the final sequence in Block #14. Otherwise, they are temporarily removed from service.

Block #11 tests the loop and exit is called if pairings have occurred. At this juncture, each source has been tested to determine if the common physical property is the same as the predetermined goal value, in which case it is self-paired, pairing with a corresponding source in the arrays containing sources with common physical property values above and below the predetermined goal value, or pairing with any other source and meeting the time and predetermined goal value constraints. If no pairings have been made, then Block #12 is active and the predetermined goal value is readjusted and the loop is re-established in Block #1.

Figure 3:
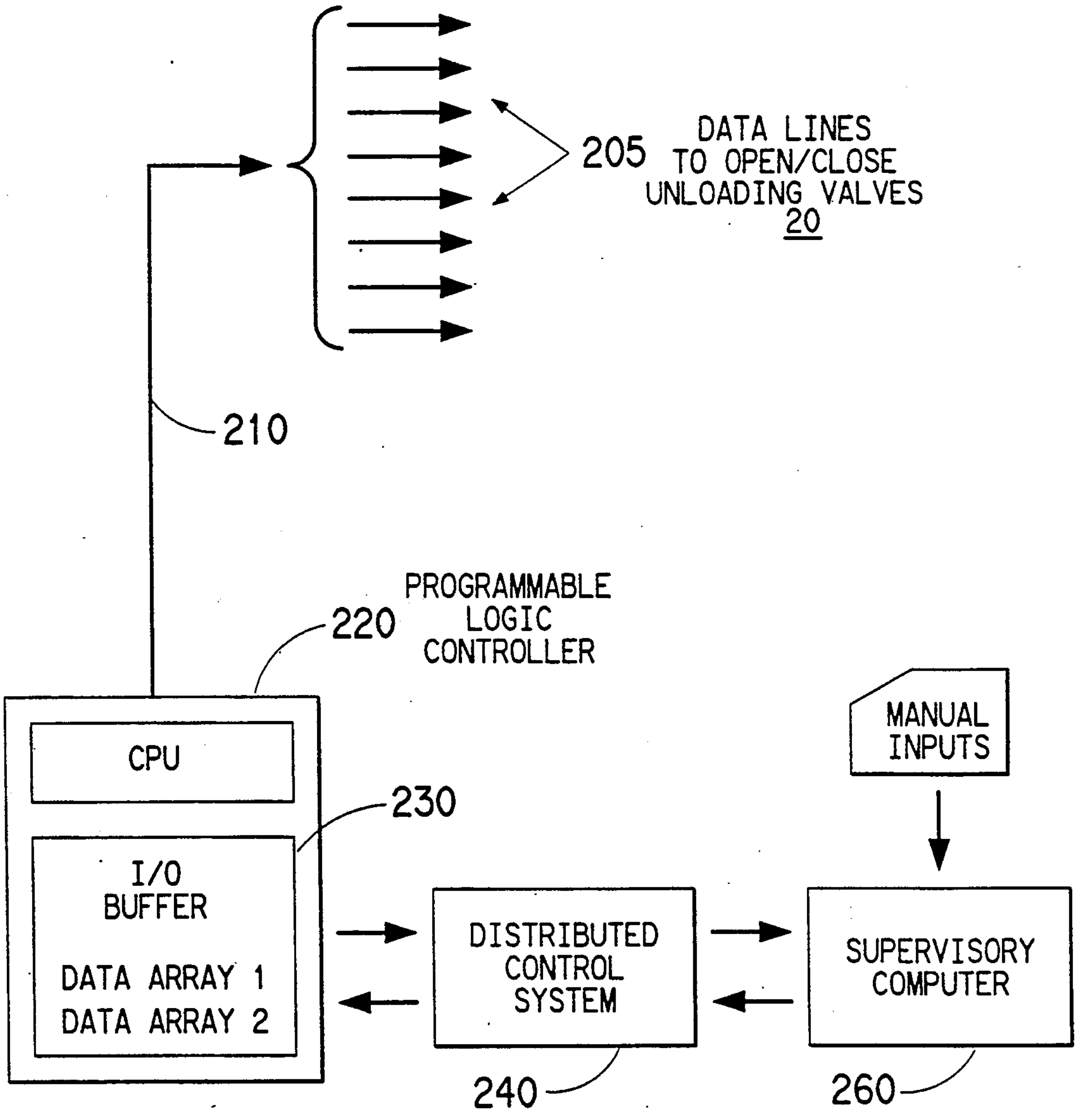
FIG. 3 shows schematically the connectivity of various process control elements.

Block #14 is the buffer holding the sequence of valid source pairs which have been arrived at via the paths detailed above. At this point, the sequence is downloaded to the PLC 220 and stored in the buffer 230. FIG. 3, shows the connectivity of the various data processing and control systems. FIG. 1 shows the connectivity of the process. The PLC 220, shown in FIGS. 1 and 3, receives the sequence and timer data through the DCS 240. Note that the DCS 240 is not active in the control or calculation of time and sequence data. The data highway provided by the DCS 240 in connection with the supervisory computer 260 and PLC 220 is its only active feature.

Signals from the PLC 220 to the unloading source valve drivers are activated in sequence for the prescribed time periods and solid is loaded into the silos 100 as shown. The time and sequence calculation process is repetitively performed as the source compartments empty. Process continuity is maintained by providing sufficient inventory of solid that can be blended according to the process of the invention to achieve the predetermined goal value set for the process.

EXAMPLE

A supply of polyethylene flake from four sources, i.e. multi-compartment railcars, is connected to the process equipment schematically as shown in FIG. 1, via 8 hoses (15 in FIG. 1). Each polyethylene flake supply was characterized, by the supplier, for a common physical property, melt index (MI) and rheology number (RN) which together determine the common physical property (CFP) to be expected from each individual source of flake. The actual value of the CPP is given by the following expression:

$$CPP(LBS./HR.) = 330.56 - 2.2 \times RN - 80 \times MI$$

The predetermined goal value (PGV) set for the process was equal to 170.0 lbs/hour. A tolerance on PGV of ±1.0 lb/hour was determined empirically to be adequate for the process of this example.

The hose connections to available railcars (A–F) and railcar compartments (1–4) were made as shown in the table below.

| HOSE NO. | RAILCAR | COMPARTMENT | MI | RN | CPP |
|---|---|---|---|---|---|
| 1 | A | 1 | .85 | 48.0 | 156.96 |
| 2 | B | 1 | .85 | 48.0 | 156.96 |
| 3 | C | 1 | .81 | 45.5 | 165.66 |
| 4 | C | 2 | .81 | 45.5 | 165.66 |
| 5 | D | 1 | .79 | 44.7 | 169.02 |
| 6 | E | 1 | .79 | 44.7 | 169.02 |
| 7 | C | 3 | .81 | 45.5 | 165.66 |
| 8 | F | 1 | .71 | 44.5 | 175.86 |

In this example, there was one solids source, Hose 8, above PGV and two solids source, Hose 5 and Hose 6, at PGV within the ±1.0 lb/hour tolerance. The remaining hoses were outside the PGV range and were paired so as to produce a blend having the PGV.

The result of performing the sequence and delivery time algorithm was a calculated delivery sequence for paired hoses and times for delivery of solid polymer for each pair. All times were in minutes and each hose pair delivers polymer for 12.00 minutes total. That is, x=2 minutes, the lower limit on delivery times and y=10 minutes, the upper limit on delivery times. The sequential pairings and delivery times calculated are given below.

| | PAIRS | | |
|---|---|---|---|
| SOURCE 1 | TIME TO UNLOAD SOURCE 1 | SOURCE 2 | TIME TO UNLOAD SOURCE 2 |
| | MIN. | | MIN. |
| 5 | 6.00 | 5 | 6.00 |
| 6 | 6.00 | 6 | 6.00 |
| 8 | 5.46 | 7 | 6.54 |
| 8 | 5.11 | 3 | 6.89 |
| 8 | 5.11 | 4 | 6.89 |
| 8 | 8.28 | 1 | 3.72 |
| 8 | 8.28 | 2 | 3.72 |

The programmable logic controller (220 in FIG. 1.) received the above sequence and delivery times from the supervisory computer 260 and activated the delivery valves (20 in FIG. 1.) of the 8 hoses according to the indicated pairing sequence. The calculation was then repeated automatically as supplies of polyethylene in the railcars were depleted. New supplies of polyethylene are made available as depletion occurs. These new supplies will, generally each have different CPP values as determined by MI and RN. Thus a new timer and sequence table is calculated for each new polyethylene source made available for blending.

I claim:

1. A method of controlling with a computer the blending of solids from a plurality of sources, said solids in each source having at least one common physical property, to produce a blend having a predetermined goal value of said common physical property, comprising:

a) providing the computer with a data base including at least;
   (i) the predetermined goal value of the common physical property;
   (ii) a value of the common physical property for each of the sources; and
   (iii) a predetermined lower and upper time limit for withdrawing solids from the sources;
b) assigning the value of the common physical property of each source greater than the predetermined goal value to a first data array in the computer;
c) assigning the value of the common physical property of each source less than the predetermined goal value to a second data array in the computer;
d) selecting from the first data array a first source with the common physical property value closest to the predetermined goal value;
e) selecting from the second said data array a second source with the common physical property value closest to the predetermined goal value;
f) pairing the first and second sources;
g) calculating a time t(1) and a time t(2) for withdrawing solids from the paired sources according to the equations;

$$t(2) = (x + y)[P(g) - P(1)]/[P(2) - P(1)] \text{ and}$$
$$t(1) = (x + y) - t(2);$$

where;
P(g)=the predetermined goal value
P(1)=the value of the common physical property of a first source in the first data array
P(2)=the value of the common physical property of a second source in the second data array
t(1)=time for withdrawing solids from the source in the first data array,
t(2)=time for withdrawing solids from the source in the second data array,
subject to;

$$x \leqq t(1) \leqq y,$$
$$x \leqq t(2) \leqq y \text{ and}$$
$$t(1) + t(2) = (x + y),$$

where;
x=the lower time limit for withdrawing solids from the sources,
y=the upper time limit for withdrawing solids from the sources,
h) storing the calculated time t(1) and the calculated time t(2) in a buffer in the computer;
i) assigning a default value to t(1) and t(2) equal to (x+y)/2 for each solids source having a common physical property equal to P(g) and storing t(1) and t(2) in the buffer; and
j) controlling the physical property of the blend by withdrawing solids from the sources, for the times t(1) and t(2) stored in the buffer.

2. The process of claim 1 wherein steps (d), (e), (f), (g), (h), (i) and (j) are repetitively performed until at least one array is empty.

3. The process of claim 2 including the steps of readjusting the predetermined goal value toward an average of the values of the common physical properties of the remaining sources and performing steps (a) to (j).

* * * * *